(No Model.) 2 Sheets—Sheet 2.

J. F. KELLY.
ELECTRICAL MEASURING AND INDICATING APPARATUS.

No. 574,739. Patented Jan. 5, 1897.

WITNESSES:
Frank S. Ober
C. B. Eaton

INVENTOR:
John F. Kelly.
BY
H. R. Brownell
ATTORNEY

UNITED STATES PATENT OFFICE.

JOHN F. KELLY, OF PITTSFIELD, MASSACHUSETTS, ASSIGNOR OF ONE-HALF TO CUMMINGS C. CHESNEY, OF SAME PLACE.

ELECTRICAL MEASURING AND INDICATING APPARATUS.

SPECIFICATION forming part of Letters Patent No. 574,739, dated January 5, 1897.

Application filed June 16, 1896. Serial No. 595,787. (No model.)

*To all whom it may concern:*

Be it known that I, JOHN F. KELLY, a citizen of the United States, residing at Pittsfield, in the county of Berkshire and State of Massachusetts, have invented certain new and useful Improvements in Electrical Measuring and Indicating Apparatus, of which the following is a specification.

My invention relates to instruments of that class in which a swinging vane-like needle is acted upon statically by the charge upon neighboring conductors and attracted or repelled thereby, the position of the needle giving the desired information.

My invention can be embodied in static voltmeters, ground-detectors, and similar instruments, and has for its objects to produce a device which can be used with greater safety than similar devices heretofore used; also to produce one which can be used with currents of higher voltage than former instruments; also to simplify the construction, to lessen the number of parts, and to increase the compactness of such instruments.

The following is a description of a static voltmeter embodying my invention, reference being had to the accompanying drawings, in which—

Figure 1:
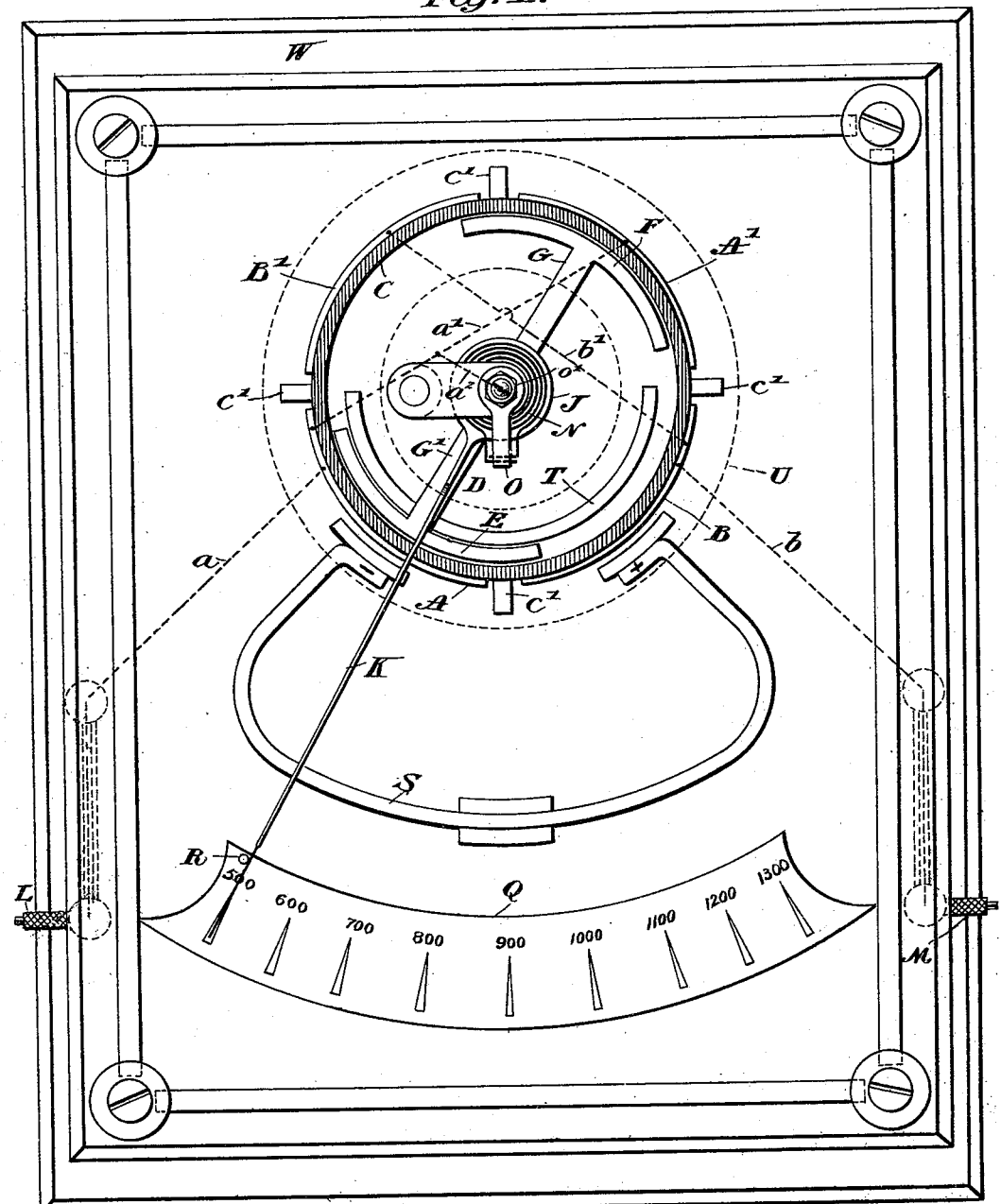
Figure 2:
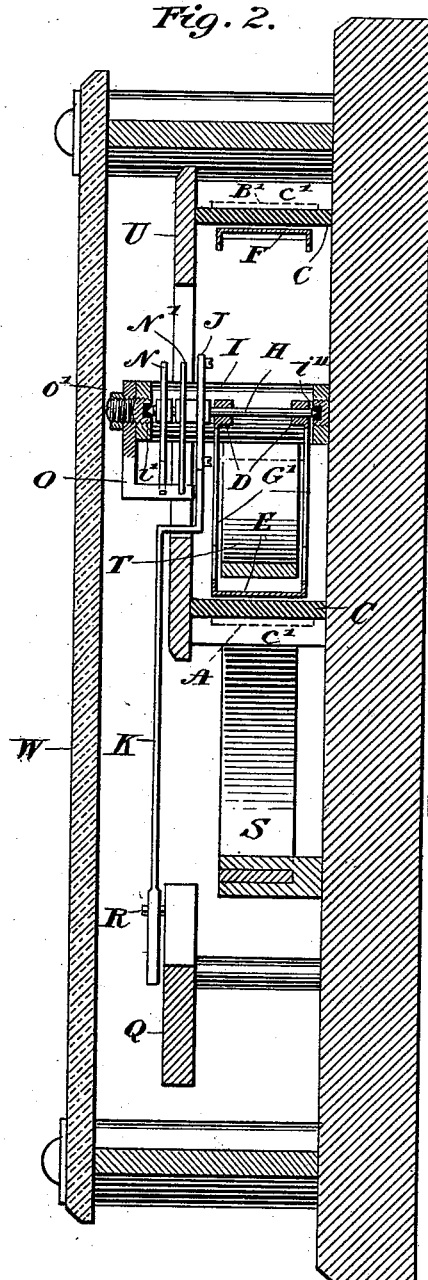
Figure 3:
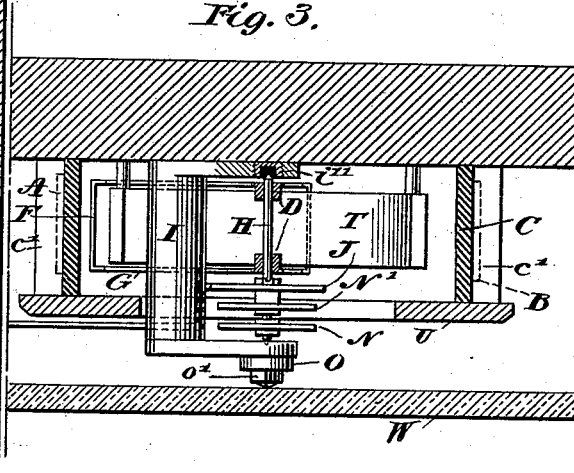
Figure 4:
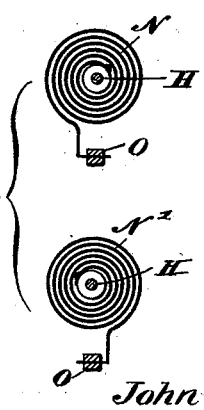

Figure 1 is a plan view of the instrument. Fig. 2 is a vertical section through the center, and Fig. 3 is a detail view. Fig. 4 is a further detail view.

In the drawings, A A' and B B' are respectively two sets of quadrants of conducting material, the members of each set being electrically connected together and each set being electrically connected by the conductors $a$ $a'$ and $b$ $b'$ to the mains L M, respectively. These quadrants are segments of a cylinder and are mounted on a cylindrical support C of insulating material, such as hard rubber. They are separated from each other by insulating ribs or projections $c'$, which serve to increase the leakage resistance between them.

D is the vibrating needle, composed of two vanes E and F, of conducting material, preferably aluminium, in the form of segments of a cylinder, electrically connected together by cross-bars G G' and through the axis H to one of the mains L by the conductors $a$, $a'$, and $a^2$. Upon the axis H, which rotates in bearings $i'$ $i''$ on the support I is mounted a balance-wheel J, which carries a pointer K. The axis H also has mounted upon it two coiled springs N N', the outer ends of which are attached to an arm O, which is adjustably secured to the support I by the nut $o'$. The springs N and N' are coiled in opposite directions, so that as one opens the other closes. This makes the spring action more regular and reduces the effect of any change in the springs themselves.

The position of the pointer K can be read upon the scale Q over which it passes. The pointer is preferably held by a stop R until the voltage approaches that normally to be measured.

By adjusting the position of the arm O the needle D can be put under any tension that may be necessary to adjust the instrument for use.

S is a stationary permanent magnet of which T is the armature, the magnet and armature-keeper being so situated that lines of force are always directed through one of the vanes of the needle D. This makes the instrument dead-beat, the magnetic flux being drawn through the moving needle and setting up Foucault currents which serve to dampen its vibrations.

The top of the cylindrical support C is closed by a cover U, of insulating material, and the whole instrument is inclosed in a case W, the back of which serves as a base for the cylinder C, support I, and the various leading conductors and their binding-posts. It is possible in a voltmeter of this sort to omit the set of quadrants electrically connected to the needle, and yet, the electrical connection between the needle and main being maintained, have a working voltmeter. The two sets of quadrants are, however, preferably present and result in a more efficient instrument.

The particular instrument I have above described with the needle electrically connected to the ground instead of to one of the mains becomes a differential instrument, such as may be used for detecting grounds. The electrical connections do not, however, form a part of my invention, as that lies in the construction aside from such electrical connections and the various uses to which such an instrument can be applied when connected up in various ways.

The use of the solid dielectric cylinder C allows of the use of the instrument with high electromotive forces without danger of sparking from the needle to the opposed quadrants, while at the same time, on account of the fact that the inductive capacity of rubber and similar dielectrics is much higher than air, the attractive action is really much larger. The only air-gap that is necessary is such as will allow the needle to swing freely.

What I claim as my invention, and desire to secure by Letters Patent, is—

1. In a measuring and indicating instrument the combination of a vibrating needle and stationary quadrants separated from each other by a wall of insulating material, substantially as described.

2. In a static measuring and indicating instrument, the combination of stationary quadrants and a vibrating needle, the quadrants and the vanes of the needle being segments of cylinders, with a cylindrical wall of insulating material placed between them, substantially as described.

3. In a static measuring and indicating instrument the combination of stationary quadrants and a vibrating needle, the quadrants and the vanes of the needle being segments of cylinders, with a permanent magnet whose lines of force lie in the path of the needle's vane, and substantially at right angles thereto, substantially as described.

4. In a static measuring and indicating instrument the combination of fixed quadrants, and a vibrating needle having vanes in close proximity to said quadrants, with a separating insulating dielectric between said needle and quadrants and a permanent magnet whose lines of force cross the path of one of the vanes of the vibrating needle, substantially as described.

5. In a static measuring and indicating instrument the combination of a vibrating needle having vanes, and fixed quadrants in close proximity to said vanes, the vanes and quadrants being in the form of segments of cylinders, with a cylindrical insulating dielectric having its wall between the vanes of said needle and said quadrants and a permanent magnet and armature, said armature and the poles of said magnet being on opposite sides of the path of said needle, substantially as described.

JOHN F. KELLY.

Witnesses:
HERBERT O. BULLARD,
M. LOUISE NICHOLS.